United States Patent
Gopalarathnam

(10) Patent No.: US 9,503,322 B2
(45) Date of Patent: Nov. 22, 2016

(54) AUTOMATIC STACK UNIT REPLACEMENT SYSTEM

(71) Applicant: Dell Products L.P., Round Rock, TX (US)

(72) Inventor: Sudharsan Dhamal Gopalarathnam, Tamil Nadu (IN)

(73) Assignee: Dell Products L.P., Round Rock, TX (US)

(*) Notice: Subject to any disclaimer, the term of this patent is extended or adjusted under 35 U.S.C. 154(b) by 185 days.

(21) Appl. No.: 13/955,879

(22) Filed: Jul. 31, 2013

(65) Prior Publication Data
US 2015/0036479 A1 Feb. 5, 2015

(51) Int. Cl.
*H04L 12/24* (2006.01)

(52) U.S. Cl.
CPC ........... *H04L 41/0813* (2013.01); *H04L 41/12* (2013.01)

(58) Field of Classification Search
CPC .................... H04L 41/12; H04L 41/0813
USPC ................................................. 370/216–228
See application file for complete search history.

(56) References Cited

U.S. PATENT DOCUMENTS

| | | | | |
|---|---|---|---|---|
| 2007/0081463 | A1* | 4/2007 | Bohra et al. | 370/235 |
| 2010/0284414 | A1* | 11/2010 | Agarwal et al. | 370/401 |
| 2013/0262377 | A1* | 10/2013 | Agarwal | 707/610 |

OTHER PUBLICATIONS

Dell PowerConnect 8024/8024F Switch User's Configuration Guide, Sep. 2011, Rev. A02.*

* cited by examiner

*Primary Examiner* — Habte Mered
*Assistant Examiner* — Kent Krueger
(74) *Attorney, Agent, or Firm* — Haynes and Boone, LLP

(57) ABSTRACT

Systems and methods for replacing a stack unit in a stack system include determining that a first and a second port that are located on opposite ends of the stack system are inactive when operating in a stack port mode after being connected to respective ports on a new stack unit that are operating in a Ethernet port mode. In response, the first and second port are converted from the stack port mode to the Ethernet port mode. A stack port probe packet is then sent from the first and second port to the new stack unit that cause the new stack unit to convert its connected ports from the Ethernet port mode to the stack port mode. A stack port probe reply is then received through the first and second port from the new stack unit and, in response, the first and second port are converted from the Ethernet port mode to the stack port mode.

19 Claims, 7 Drawing Sheets

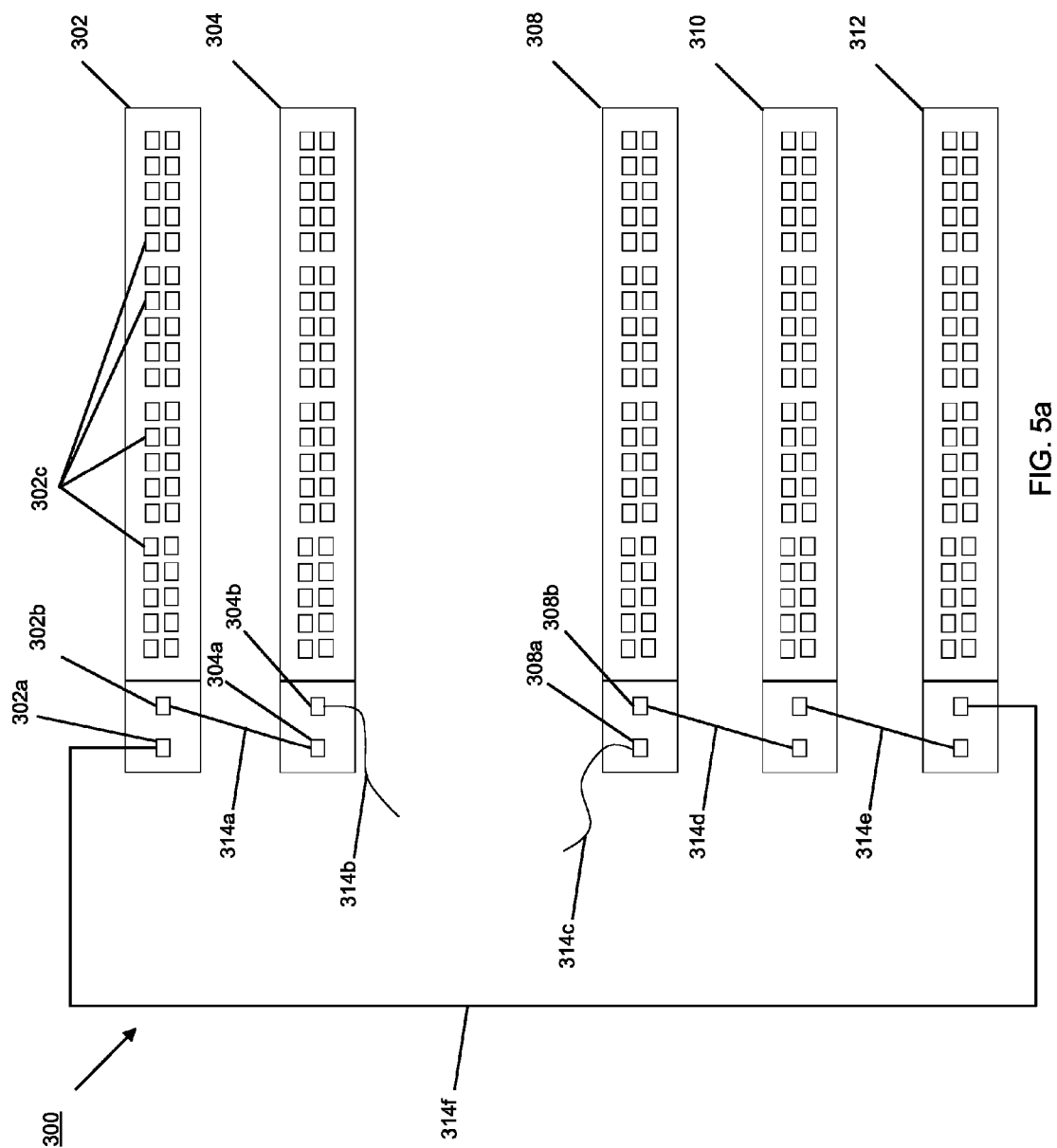

AUTOMATIC STACK UNIT REPLACEMENT SYSTEM

BACKGROUND

The present disclosure relates generally to information handling systems (IHSs), and more particularly to systems and methods for replacing IHSs in a stacked IHS system As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, switch IHSs, may be "stacked" with one or more other switch IHSs such that the plurality of switch IHSs operate together like a single switch IHS but have a port capacity equal to the sum of the combined switch IHSs. Typically, a switch IHS stack system includes a plurality of switch IHSs coupled together in a ring, with a first switch IHS coupled to a second switch IHS, the second switch IHS coupled to a third switch IHS, and so on up until a last switch IHS is coupled both to the second-to-last switch IHS and to the first switch IHS. Occasionally, one of the switch IHSs in the switch IHS stack system must be replaced (e.g., due to a failure in that switch IHS, and upgrade to a new switch IHS, and/or due to a variety of other replacement scenarios known in the art.) Conventionally, the replacement of a switch IHS in the switch IHS stack system includes disconnecting the "old" switch IHS (i.e., the switch IHS that is being replaced) from the switch IHS stack system, connecting the "new" switch IHS (i.e., the switch IHS that is replacing the old switch IHS) to the switch IHS stack system in place of the old switch IHS (e.g., using the same connection lines used for the old switch IHS in some situations), and configuring stack ports on the new switch IHS that are used to communicate with to the switch IHS stack system so that the new switch IHS may operate with the switch IHS stack system. The configuration of stack ports on a new switch IHS added to an existing switch IHS stack system can raise a number of issues.

For example, conventional methods of configuring stack ports on a new switch IHS that is added to an existing switch IHS stack system include creating a stack port configuration file for the new switch IHS that includes the stack port information, and providing that stack port configuration file to the new switch IHS, or logging into a management console connected to the new switch IHS to configure stack ports manually. Both of these conventional methods require a manual determination of the stack port configuration of the stack ports, along with providing a management connection to the new switch IHS to provide that stack port configuration on the new switch IHS. Because switch IHSs in a switch IHS stack system do not need console or telnet connections during switch IHS stack system operation, these conventional methods require a user to provide a temporary physical connection (e.g., a cable) between the new switch IHS and management console each time a switch IHS in the switch IHS stack system is replaced. The need to manually determine stack port configuration on a new switch IHS being added to a switch IHS stack system, and the need to provide a physical connection to the new switch IHS to provide that configuration (and then remove that physical connection) is time consuming and error prone.

Accordingly, it would be desirable to provide an improved system and method for replacing a switch IHS in a switch IHS stack system.

SUMMARY

According to one embodiment, a stack unit includes a first stack unit chassis; a first port included on the first stack unit chassis; and a stack unit replacement engine that is coupled to the first port and that is operable to: determine that the first port is located on a first end of a stack system and is inactive when operating in a stack port mode; determine that a second port that is included on a second stack unit chassis is located on a second end of the stack system and is inactive when operating in the stack port mode; in response to determining that the first port is located on the first end of the stack system and is inactive when operating in the stack port mode and that the second port is located on the second end of the stack system and is inactive when operating in the stack port mode, convert the first port from the stack port mode to a Ethernet port mode; send a stack port probe packet from the first port operating in the Ethernet port mode to a new stack unit; and receive a stack port probe reply through the first port from the new stack unit and, in response, convert the first port from the Ethernet port mode to the stack port mode.

BRIEF DESCRIPTION OF THE DRAWINGS

FIG. 5a is a schematic view illustrating a stack unit removed from the stack system of FIG. 3.

FIG. 5b is a schematic view illustrating a new stack unit being added to the stack system of FIGS. 3 and 5a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
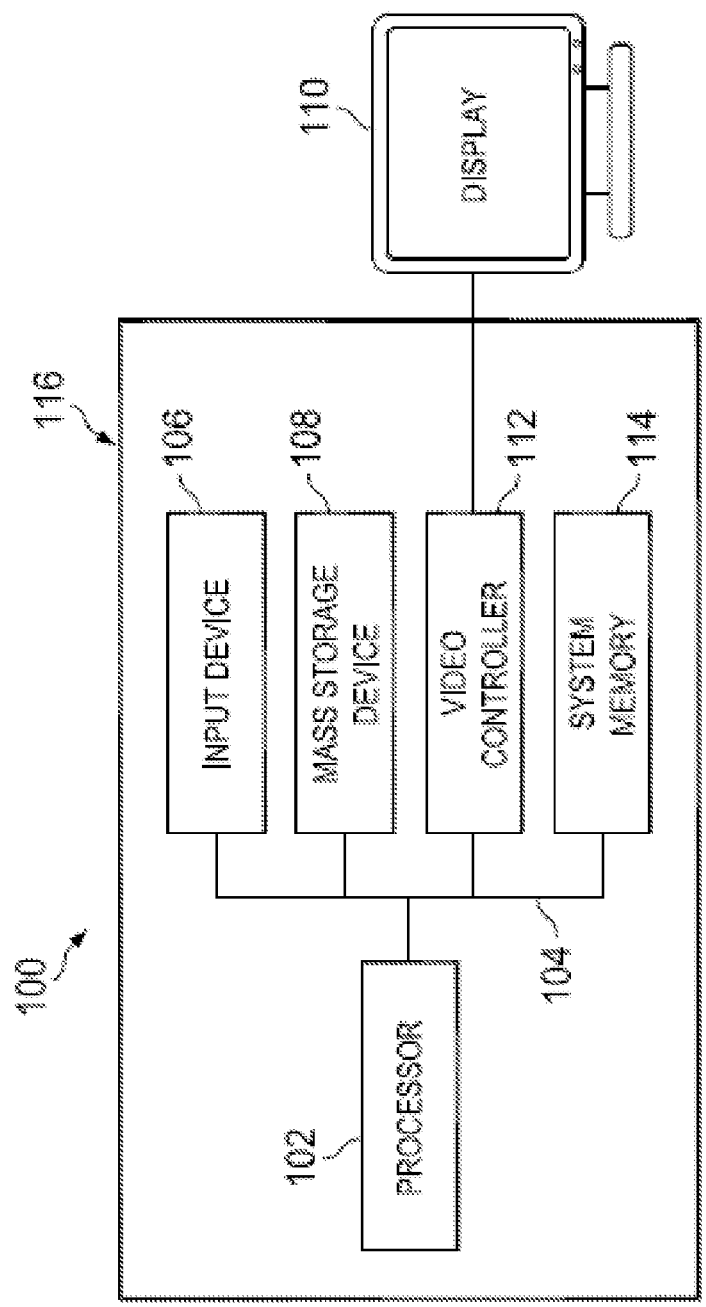
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
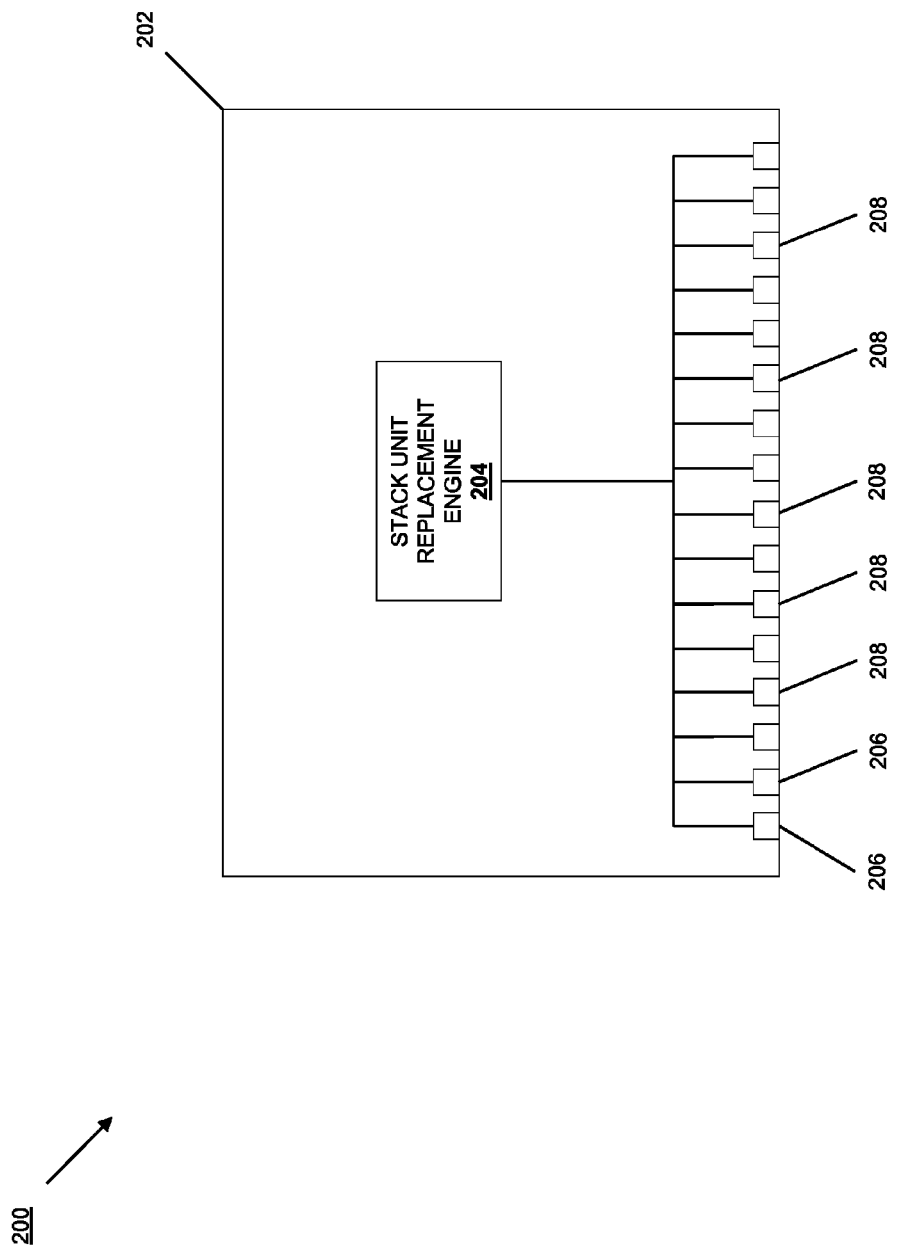
FIG. 2 is a schematic view illustrating an embodiment of a stack unit.

Referring now to FIG. 2, an embodiment of a stack unit 200 is illustrated. In an embodiment, the stack unit 200 may be the IHS 100 discussed above with reference to FIG. 1, and/or may include some or all of the components of the IHS 100. For example, in some embodiments, the stack unit 200 is a switch IHS or other packet handling device that is operable to be coupled with other switch IHSs into a switch IHS stack system in which the plurality of switch IHSs in the switch IHS stack system operate together like a single switch IHS but have a port capacity equal to the sum of the combined switch IHSs in the switch IHS stack system. Thus, while the stack unit 200 illustrated in FIG. 2 only includes components discussed below for providing stack unit replacement in a stack system, the stack unit 200 may include other components for enabling the operations of a switch IHS or other packet handling device including, but not limited to, route processing managers, switch fabric cards, line cards, backplanes, and/or a variety of other packet handling components known in the art.

The stack unit 200 includes a stack unit chassis 202 which may be the chassis 116 discussed above with reference to FIG. 1. The stack unit chassis 202 may house a processor (not illustrated, but which may be the processor 102 discussed above with reference to FIG. 1) and a non-transitory memory (not illustrated, but which may be the storage device 108 or system memory 114 discussed above with reference to FIG. 1.) In an embodiment, the non-transitory memory housed in the stack unit chassis 202 includes instructions that, when executed by the processor, cause the processor to provide a stack unit replacement engine 204 that provides the functionality discussed below. While the stack unit replacement engine 204 is illustrated an housed in the stack unit chassis 202 of a single stack unit 200, in some embodiments multiple stack units that are substantially similar to the stack unit 200 may be coupled together in a stack system, discussed below, and the stack unit replacement engines in those stack units may operate as a stack unit replacement engine for the entire stack system. In other words, the functionality of the stack unit replacement engine discussed below with regard to stack units in a stack system may be enabled by a single stack unit replacement engine housed in a single stack unit chassis of a single stack unit, or may be enabled by multiple stack unit replacement engines housed in different stack unit chassis of different stack units.

In the illustrated embodiment, the stack unit 200 includes a plurality of ports 206 and 208 that are coupled to the stack unit replacement engine 204. As discussed below, the plurality of ports 206 may include a plurality of stacking/control ports that may be coupled to a control plane, and the plurality of ports 208 may include a plurality of traffic ports that are coupled to a data plane. However, while the illustrated embodiment includes dedicated stacking/control ports and traffic ports, one of skill in the art will recognize that the stack unit 200 may be configured to allow stacking with other stack units using any ports 206 and 208 on the stack unit 200, and to allow transmitting of traffic using any other ports 206 and 208 on the stack unit 200. In some embodiments, the stack unit replacement engine 204 and ports 206 may include hardware and/or software that allows for the dynamic configuration of the ports 206, while in some embodiments, the stack unit replacement engine 204 and ports 206 and 208 may include hardware and/or software that allows for the dynamic configuration of the ports 206 and 208. For example, such hardware and/or software may provide the ability to dynamically change the operation of the ports 206 and/or 208 between a stack port mode and an Ethernet port mode (or other non-stack port modes) without the need to reset or reload the processor in the stacking unit that includes those ports. In one specific example, the Trident II Series switch processor available from Broadcom Corporation of Irvine, Calif. provides appropriate hardware for dynamically converting a port between a stack port mode to a Ethernet port mode.

In a specific embodiment, operation of a port on a stack unit according to the stack port mode provides for communication between that port and a port on another stack unit that is operating according to the stack port mode, while operation of a port on a stack unit according to the Ethernet port mode provides for communication between that port and a port on another stack unit that is operating according to the Ethernet port mode. However, a port on a stack unit that is operating according to the stack port mode cannot communicate with a port on another stack unit that is operating according to the Ethernet port mode (or other non-stack port modes), and vice versa. For example, switch IHSs available from Broadcom Corporation of Irvine, Calif. provide a stack port mode for ports that may include a proprietary protocol or interconnect scheme called HiGig mode, HiGig+ mode, or HiGig2 mode, while providing an Ethernet port mode for ports that may be referred to as XE mode. In an embodiment, HiGig mode may refer to the formatting of packets for transmission between switch IHSs, and may utilize the preamble field of an Ethernet packet along with four bytes of interpacket gap to allow HiGig mode ports to connect to other HiGig mode ports. HiGig mode may be used by switch IHSs to support features such as mirroring, link aggregation, and quality of service across multiple switch IHSs or other devices in a system, with information communicated via a module header that is prep ended to the beginning of each packet. In an embodiment, XE mode allows is an Ethernet mode that allows for data traffic communication. One of skill in the art will appreciate that a port on a stack unit operating in HiGig mode (or other stack port modes) cannot communicate with a port on a stack unit operating in XE mode (or other non-stack port modes) due to the ports operating in those different modes varying at the physical layer/PHY level itself.

Figure 3:
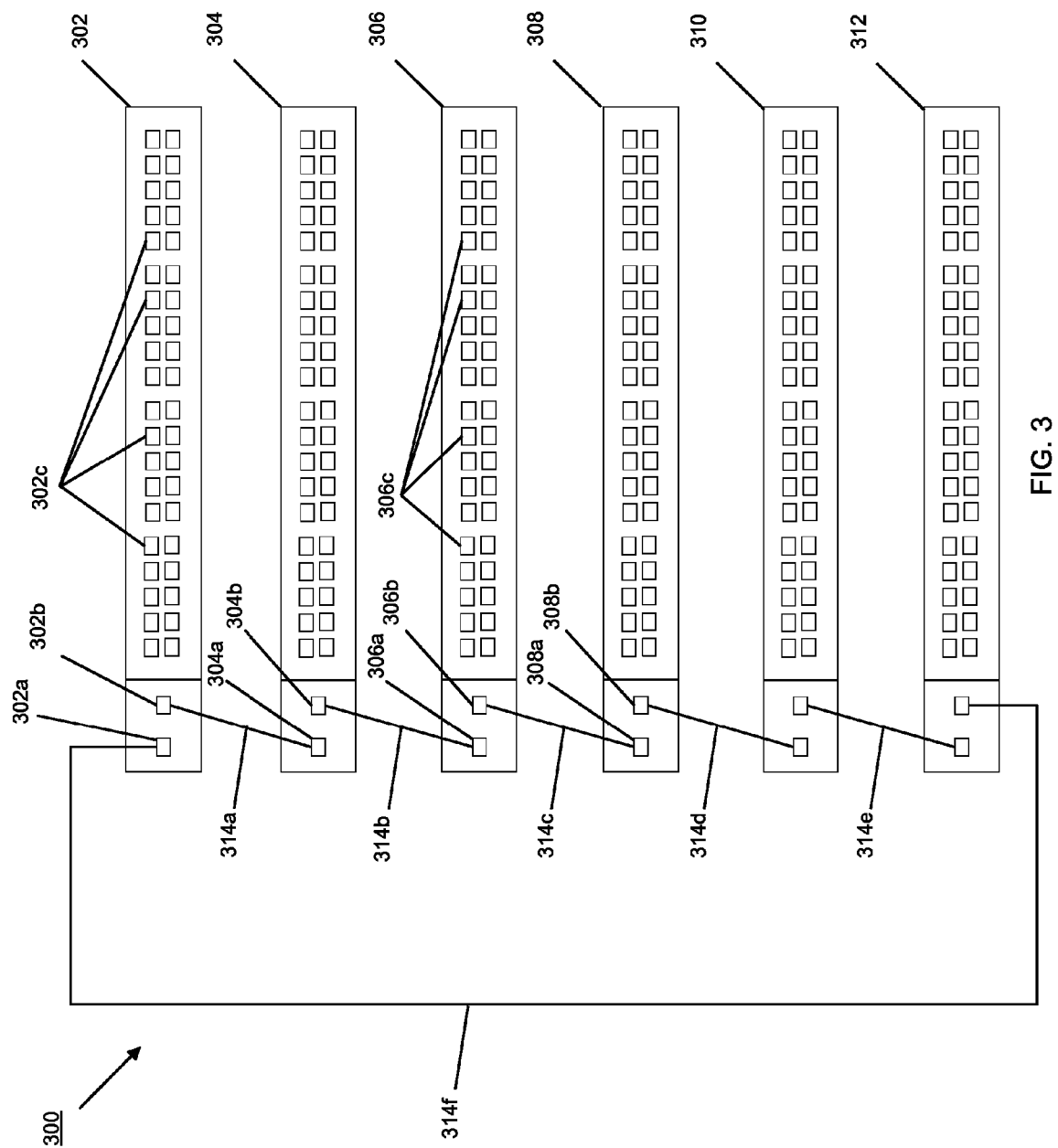
FIG. 3 is a schematic view illustrating an embodiment of a stack system including a plurality of the stack units of FIG. 2.

Referring now to FIG. 3, an embodiment of a stack system 300 is illustrated. In some embodiments, the stack system 300 may be referred to as an IHS stack system (when including a plurality of stacked IHSs), a switch IHS stack system (when including a plurality of switch IHSs), and/or by a variety of other stacking terminology known in the art. In the illustrated embodiment, the stack system 300 includes a plurality of stack units 302, 304, 306, 308, 310, and 312. While only six stack units are illustrated in the stack system 300, one of skill in the art in possession of the teachings of the present disclosure will recognize that any number of stack units may be included in the stack system 300 without departing from the scope of the present disclosure. Any or all of the stack units 302-312 may be the stack unit 200, discussed above with reference to FIG. 2, and/or include some or all of the components of the stack unit 200. In the illustrated embodiment, each of the stack units 302-312 includes stacking/control ports (e.g., the ports 302a and 302b on stack unit 302, the ports 304a and 304b on stack unit 304, the ports 306a and 306b on stack unit 306, the ports 308a and 308b on stack unit 308, etc.) and traffic ports (e.g., the ports 302c on stack unit 302, the ports 306c on stack unit 306, etc.), with the stacking/control ports connected to provide a ring stack configuration.

For example, in the illustrated embodiment, the stacking/control port 302b on the stack unit 302 is connected to the stacking/control port 304a on the stack unit 304 by a link 314a (e.g., a cable); the stacking/control port 304b on the stack unit 304 is connected to the stacking/control port 306a on the stack unit 306 by a link 314b; the stacking/control port 306b on the stack unit 306 is connected to the stacking/control port 308a on the stack unit 308 by a link 314c; the stacking/control port 308b on the stack unit 308 is connected to a stacking/control port on the stack unit 310 by a link 314d; a stacking/control port on the stack unit 310 is connected to a stacking/control port on the stack unit 312 by a link 314e; and a stacking/control port on the stack unit 312 is connected to the stacking/control port 302a on the stack unit 302 by a link 314f. One of skill in the art will recognize that the traffic ports on the stack units 302-312 may be connected to a variety of devices in a networked system to provide for packet distribution throughout the networked system. While the stack system 300 has been illustrated and described as a switch IHS stack system, any other devices capable of stacking and that may require replacement of devices in the stacked system are envisioned as falling without the scope of the present disclosure.

Figure 4:
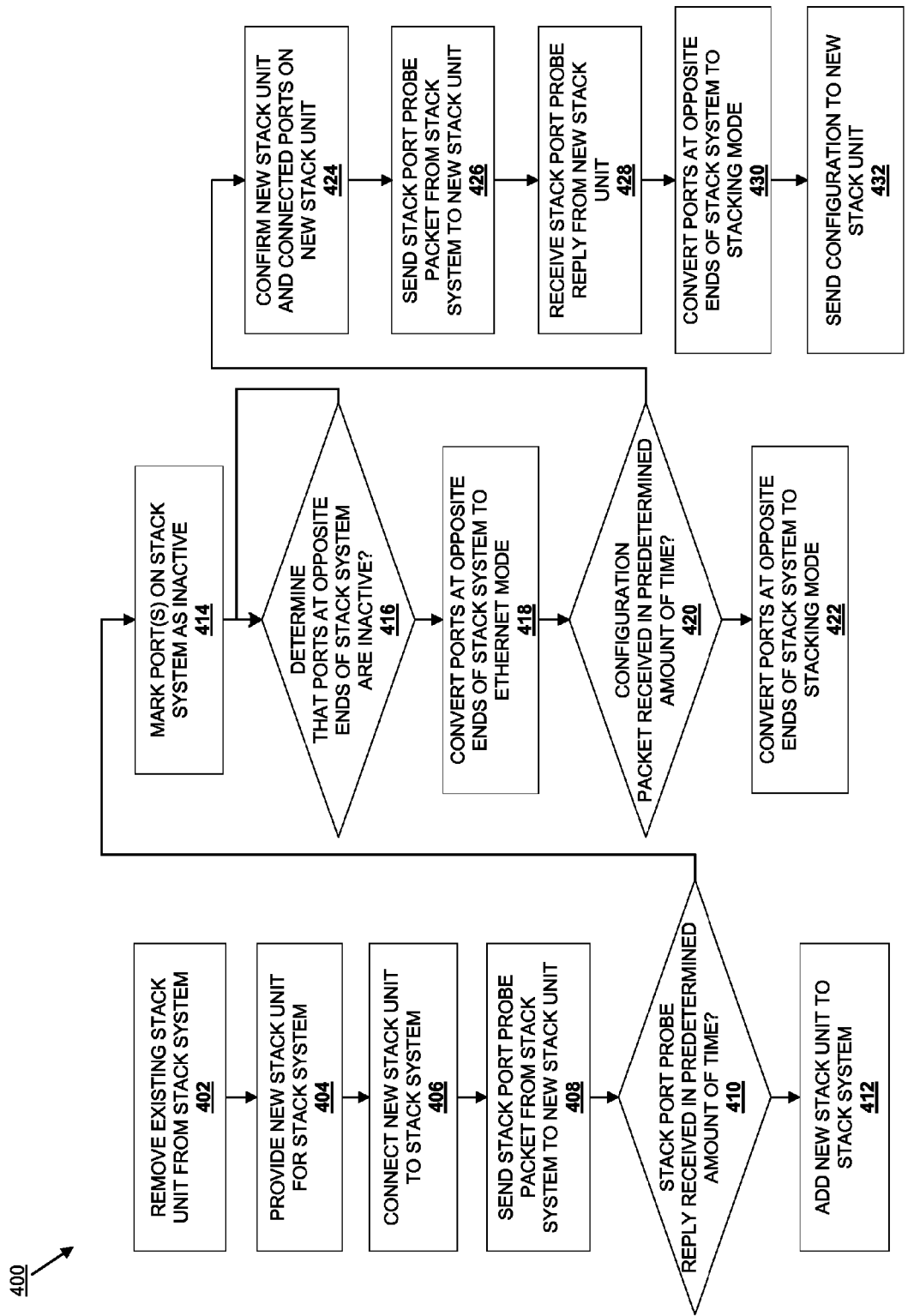
FIG. 4 is a flow chart illustrating an embodiment of a method for automatically replacing a stack unit in a stack system.

Referring now to FIGS. 3, 4, and 5a, an embodiment of a method 400 for replacing a stack unit in a stack system is illustrated. Prior to the method 400, a stack system such as, for example, the stack system 300 of FIG. 3, is provided until one or more stack units in the stack system must be replaced. For example, the stack unit 306 in the stack system 300 may need to be replaced due to a failure in the stack unit 306, due to a system upgrade that include replacing the stack unit 306 with a new stack unit, and/or due to a variety of other replacement scenarios known in the art. When operating in the stack system 300 while connected to the stack unit 306, the stacking/control port 304b on the stack unit 304 is operating according to the stack port mode (e.g., HiGig mode), and the stacking/control port 308a is operating according to the stack port mode (e.g., HiGig mode.) Following the determination that a stack unit in the stack system must be replaced, the method 400 begins at block 402 where an existing stack unit is removed from the stack system. For example, the stack unit 306 may be removed from the stack system 300 by disconnecting the link 314b from the stacking/control port 306a on the stack unit 306, and disconnecting the link 314c from the stacking control port 306b on the stack unit 306, as illustrated in FIG. 3 (illustrating the stack unit 306 connected to the stack system 300) and 5a (illustrating the stack unit 306 disconnected and removed from the stack system 300.) With the stack unit 306 removed from the stack system 300, the ring stack configuration (illustrated in FIG. 3) is broken and the stack system 300 is provided in a daisy chain stack configuration (illustrated in FIG. 5a), with the stack unit 304 provided at one end of the daisy chain stack configuration and the stack unit 308 provided at the other end of the daisy chain stack configuration. In an embodiment, with the stack unit 306 removed from the stack system 300, the stacking/control port 304b on the stack unit 304 is operating according to the stack port mode (e.g., HiGig mode), and the stacking/control port 308a is operating according to the stack port mode (e.g., HiGig mode.)

Figure 5B:
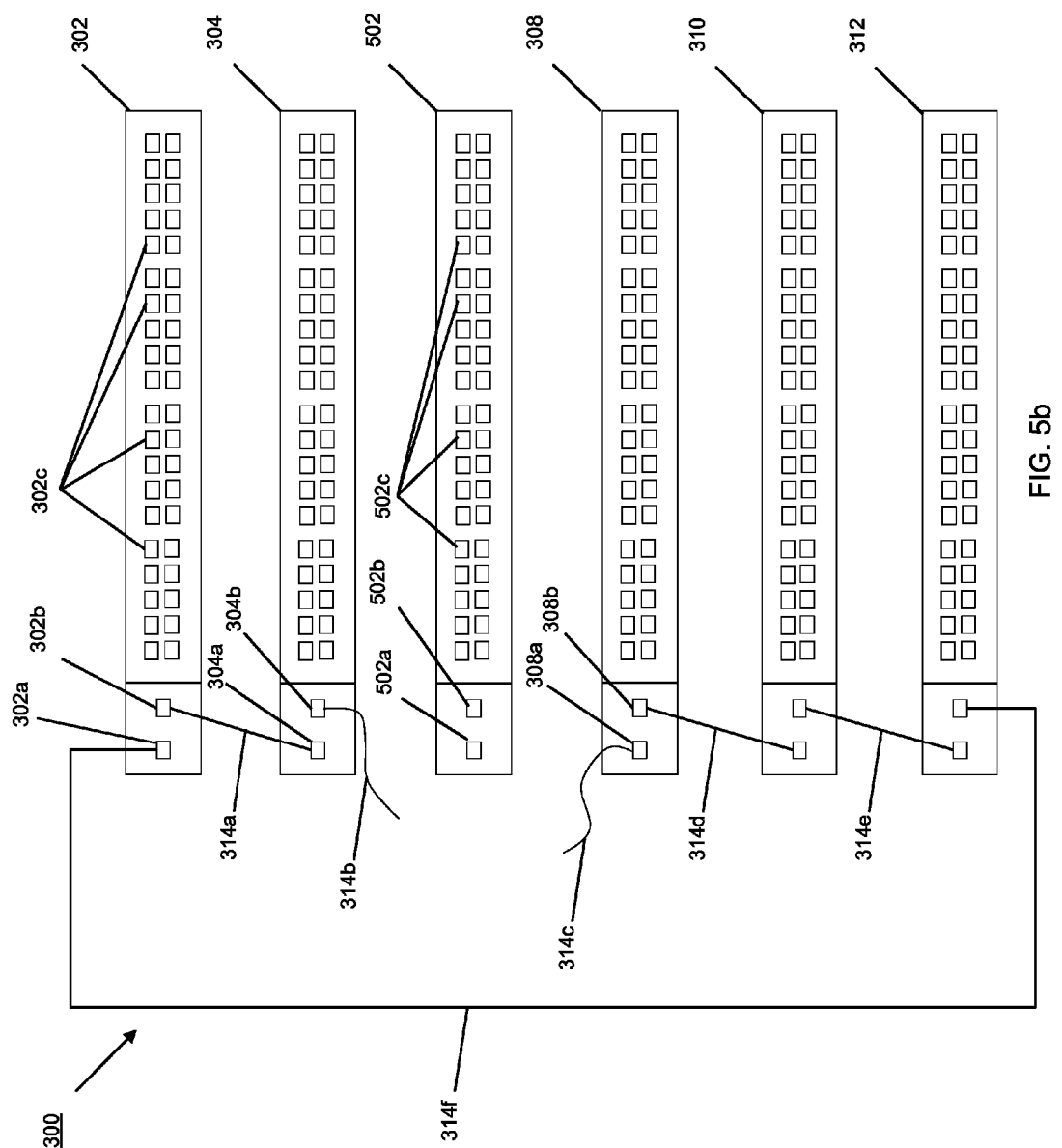

Referring now to FIGS. 4, 5a, and 5b, the method 400 then proceeds to block 404 where a new stack unit is provided for the stack system. In an embodiment, a new stack unit 502, illustrated in FIG. 5b, may be provided in place of the stack unit 306 that was removed from the stack system 300 in block 402 of the method 400. The new stack unit 502 may be the stack unit 200, discussed above with reference to FIG. 2, and/or may include some or all of the components of the stack unit 200. In the illustrated embodiment, the new stack unit 502 includes stacking control ports 502a and 502b, as well as traffic ports 502c. However, as discussed above for the stack units 200 and 302-312, while the illustrated embodiment includes dedicated stacking/control ports and traffic ports, one of skill in the art will recognize that the stack unit 502 may be configured to allow stacking using any ports 502a, 502b, and/or 502c on the stack unit 502 and to transmit traffic using any other ports 502a, 502b, and/or 502c on the stack unit 502. In an embodiment, when provided for the stack system 300 at block 404 of the method 400, the new stack unit 502 is in a non-configured mode (also known as a "bare-metal provisioning" (BMP) mode) with the stacking/control ports 502a and 502b in the Ethernet port mode (e.g., XE mode).

Figure 5C:
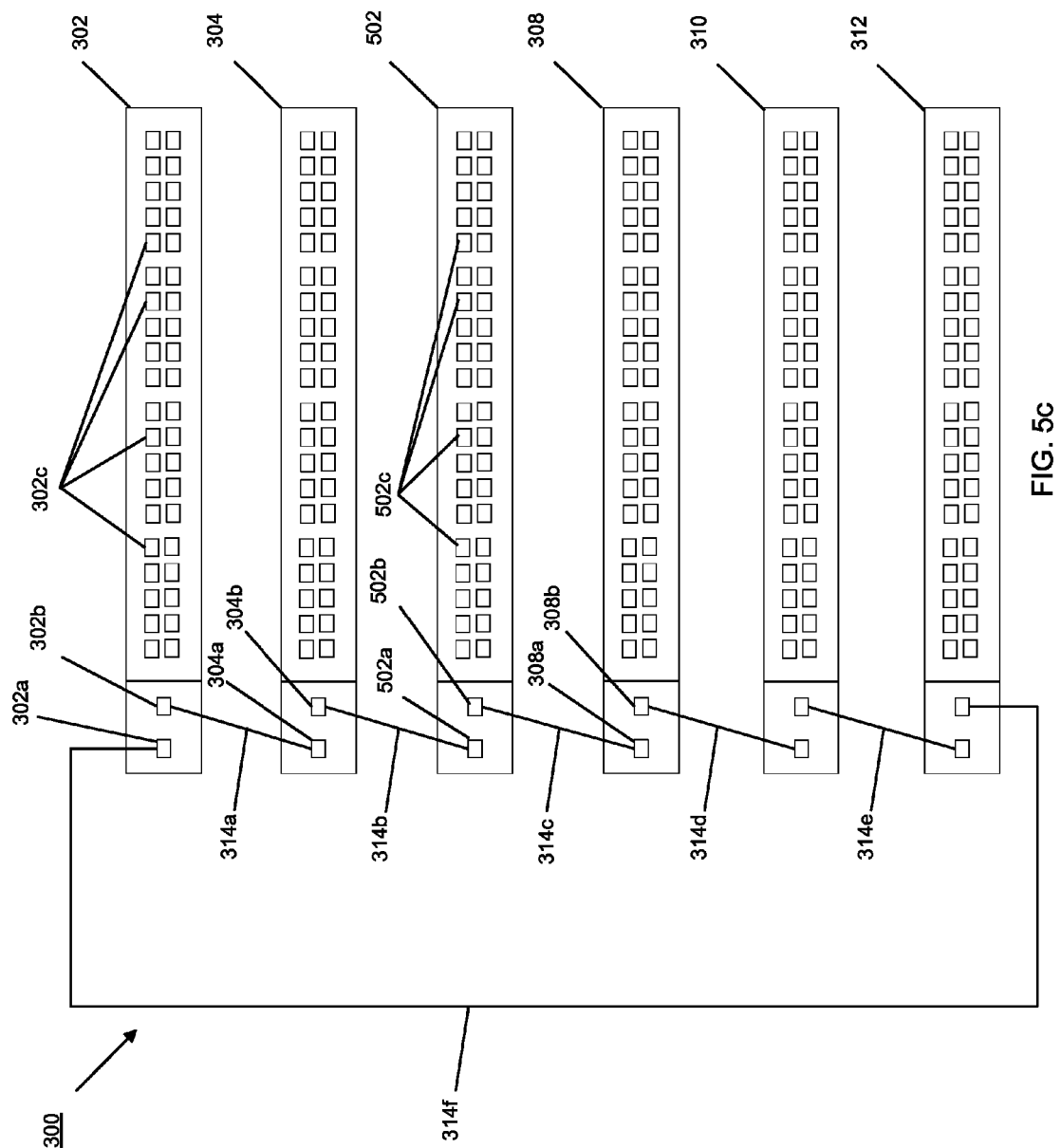
FIG. 5c is a schematic view illustrating a new stack unit added to the stack system of FIGS. 3, 5a, and 5b.

Referring now to FIGS. 4, 5b, and 5c, the method 400 then proceeds to block 406 where the new stack unit is connected to the stack system. In an embodiment, the link 314b connected to the port 304b on the stack unit 304 may be connected to the port 502a on the new stack unit 502, and the link 314c connected to the port 308a on the stack unit 308 may be connected to the port 502b on the new stack unit 502, as illustrated in FIGS. 5b and 5c. Following the connection of the new stack unit 502 to the stack system 300, the stacking/control port 304b on the stack unit 304 will be "up" (e.g., connected to a link) and in the stack port mode, the stacking/control port 308a will be "up" and in the stack port mode, and the stacking/control ports 502a and 502b on the new stack unit 502 will be "up" and in the Ethernet port mode. In an embodiment, ports on stack units in the stack system 300 that are "down" (e.g., not connected to another stack unit) are not considered for stacking.

The method 400 then proceeds to block 408 where a stack port probe packet is sent from the stack system to the new stack unit. In an embodiment, the stack unit replacement engine (e.g., on the stack unit 304, on the stack unit 308, and/or provided by a plurality of stack units in the stack system 300, etc.) sends a stack port probe packet from the stacking/control port 304b on the stack unit 304 to the stacking/control port 502a on the new stack unit 502 over the link 314b, and sends a stack port probe packet from the stacking/control port 308a on the stack unit 308 to the stacking/control port 502b on the new stack unit 502 over the link 314c.

The method 400 then proceeds to decision block 410 where it is determined whether a stack port probe reply has been received within a predetermined amount of time. In an embodiment, the stack unit replacement engine (e.g., on the stack unit 304, on the stack unit 308, and/or provided by a plurality of stack units in the stack system 300, etc.) monitors the time period following the sending of the stack port probe packets at block 408 to determine whether a predetermined amount of time has passed since the sending of the stack port probe packets. The predetermined amount of time may be determined by a stack unit manufacturer, determined or modified by a stack system administrator, and/or determined by a variety of other entities known in the art.

If, at decision block 410, it is determined that a stack port probe reply has been received within a predetermined amount of time, the method 400 proceeds to block 412 where a new stack unit is added to the stack system. In embodiment discussed above with reference to FIGS. 5b and 5c, the method 400 would not proceed to block 412 because the stacking/control port 304b on the stack unit 304 and the stacking/control port 308a on the stack unit 308 are both in the stack port mode, while the stacking/control ports 502a and 502b on the new stack unit 502 are both in the Ethernet port mode. In other words, the stack units 304 and 308 cannot communicate with the new stack unit 502 because their ports are operating in different modes, and thus the new stack unit 502 would not provide a stack port probe reply in response to the sending of the stack port probe packets from the stack system 300 to the new stack unit. However, if a new stack unit were connected to the stack system 300 with the ports operating in the stack port mode (e.g., due to a reset of a stack unit, pre-configuration of the ports on a new stack unit, etc.), block 412 of the method 400 would allow that new stack unit to reply to the stack port probe packets and be added to the stack system 300.

If, at decision block 410, it is determined that a stack port probe reply has not been received within a predetermined amount of time, the method 400 proceeds to block 414 where ports on the stack system are marked as inactive. In the illustrated embodiment with the new stack unit 502 connected to the stack system 300, the stacking/control port 304b on the stack unit 304 and the stacking/control port 308a on the stack unit 308 are both in the stack port mode, while the stacking/control ports 502a and 502b on the new stack unit 502 are both in the Ethernet port mode, and thus no stack port probe reply will be sent by the new stack unit in response to the sending of the stack port probe packets from the stack system 300 to the new stack unit 502. In that situation, the stack unit replacement engine (e.g., on the stack unit 304, on the stack unit 308, and/or provided by a plurality of stack units in the stack system 300, etc.) will determine that the stack port probe reply has not been received in the predetermined amount of time and, in response, will mark each of the stacking/control port 304b on the stack unit 304 and the stacking/control port 308a on the stack unit 308 as inactive.

The method 400 then proceeds to decision block 416 where it is determined whether ports at the opposite ends of the stack system are inactive. In an embodiment, with the new stack unit 502 connected to the stack system 300, as illustrated in FIG. 3, but unable to communicate with the stack units 302, 304, and 308-312 in the stack system 300 due to the stacking/control ports 502a and 502b operating in Ethernet port mode and the stacking/control ports 304b and 308a operating in the stack port mode, the stack system 300 is in the daisy chain stack configuration due to the new stack unit 502 being unable to communicate to complete the ring stack configuration. In an embodiment, the stack unit replacement engine (e.g., on the stack unit 304, on the stack unit 308, and/or provided by a plurality of stack units in the stack system 300, etc.) is operable to detect (e.g., by checking periodically, in response to marking a port as inactive, in response to a received instruction, etc.) or otherwise determine whether, when the stack system 300 is in the daisy chain stack configuration, ports at opposite ends of the stack system 300 are inactive. For example, at decision block 416 the stack unit replacement engine be operable to detect when the stacking/control port 304b on the stack unit 304 is inactive and located at a first end of the daisy chain stack configuration, and detect that the stacking/control port 308a on the stack unit 308 is inactive and located at a second end of the daisy chain stack configuration that is opposite the first end, as illustrated in FIGS. 5a, 5b, and 5c. In the illustrated embodiment, if at decision block 416 it is determined that ports at the opposite ends of the stack system are not inactive the method 400 is illustrated as looping back through decision block 416 to indicate that the stack unit replacement engine can continually perform decision block 416. However, the stack unit replacement engine may perform block 416 while performing other blocks of the method 400 as well.

If, at decision block 416, it is determined that ports at opposite ends of the stack system are inactive, the method 400 proceeds to block 418 where the ports at opposite ends of the stack system are converted to the Ethernet port mode. For example, the stack unit replacement engine (e.g., on the stack unit 304, on the stack unit 308, and/or provided by a plurality of stack units in the stack system 300, etc.) may detect that the stacking/control port 304b on the stack unit 304 is inactive and located at a first end of the daisy chain stack configuration, and detect that the stacking/control port 308a on the stack unit 308 is inactive and located at a second end of the daisy chain stack configuration that is opposite the first end and, in response, convert the stacking/control port 304b on the stack unit 304 from the stack port mode (e.g., HiGig mode) to the Ethernet port mode (e.g., XE mode), and convert the stacking/control port 308a on the stack unit 308 from the stack port mode (e.g., HiGig mode) to the Ethernet port mode (e.g., XE mode).

The method 400 then proceeds to decision block 420 where it is determined whether a configuration packet has been received in a predetermined amount of time. In an embodiment, the stack unit replacement engine (e.g., on the stack unit 304, on the stack unit 308, and/or provided by a plurality of stack units in the stack system 300, etc.) may monitor each of the stacking/control port 304b on the stack unit 304 and the stacking/control port 308a on the stack unit 308 to determine whether a Dynamic Host Configuration Protocol (DHCP) packet is received following the conversion of each of the stacking/control ports 304b and 308a from the stack port mode to the Ethernet port mode at block 418. If, at decision block 420, it is determined that no configuration packet has been received in a predetermined amount of time, the method 400 proceeds to block 422 where the ports at the opposite ends of the stack system are converted to the stack port mode. In an embodiment, if the stack unit replacement engine (e.g., on the stack unit 304, on the stack unit 308, and/or provided by a plurality of stack units in the stack system 300, etc.) determines that the stacking/control port 304b on the stack unit 304 has not received a DHCP packet in a predetermined time following the conversion of the stacking/control port 304b from the stack port mode to the Ethernet port mode, it converts the stacking/control port 304b back to the stack port mode from the Ethernet port mode. Similarly, if the stack unit replacement engine determines that the stacking/control port 308a on the stack unit 308 has not received a DHCP packet in a predetermined time following the conversion of the stacking/control port 308a from the stack port mode to the Ethernet port mode, it converts the stacking/control port 308a back to the stack port mode from the Ethernet port mode. In an embodiment, if the new stack unit 502 is disconnected from the stack system 300 after block 418 and at any time prior to completion of the method 400, the ports at the opposite ends of the stack system may be converted back to the stack port mode substantially as described with regard to block 422. Thus, if the new stack unit 502 is disconnected from the stack system 300 after converting the ports at the opposite ends of the stack system 300 to the Ethernet port mode but prior to completing the method 400, those ports are converted back to the stack port mode such that the new stack unit 502 may be reconnected to the stack system 300 and the method 400 restarted.

If, at decision block 420, it is determined that a configuration packet has been received in a predetermined amount of time, the method 400 proceeds to block 424 where the new stack unit and the connected ports on the new stack unit are confirmed. In an embodiment, the stack unit replacement engine (e.g., on the stack unit 304, on the stack unit 308, and/or provided by a plurality of stack units in the stack system 300, etc.) may determine the each of the stacking/control port 304b on the stack unit 304 and the stacking/control port 308a on the stack unit 308 received a DHCP packet (e.g., from the new stack unit 502) within a predetermined time following the conversion of the stacking/control port 304b and the stacking/control port 308a from the stack port mode to the Ethernet port mode, and the stack unit replacement engine may then confirm that the new stack unit 502 is a stack unit that is compatible to be part of the stack system 300, and that the stacking/control ports 502a and 502b are compatible for stacking the new stack unit 502 in the stack system 300.

The method 400 then proceeds to block 426 where a stack port probe packet is sent from the stack system to the new stack unit. In an embodiment, the stack unit replacement engine (e.g., on the stack unit 304, on the stack unit 308, and/or provided by a plurality of stack units in the stack system 300, etc.) may send a stack port probe packet from the stacking/control port 304b on the stack unit 304 to the stacking/control port 502a on the new stack unit 502 over the link 314b, and send a stack port probe packet from the stacking/control port 308a on the stack unit 308 to the stacking/control port 502b on the new stack unit 502 over the link 314c. Due to the converting of the stacking/control port 304b on the stack unit 304 and the stacking/control port 308a on the stack unit 308 from the stack port mode to the Ethernet port mode, the stack port probe packets sent from the stacking/control port 304b and the stacking/control port 308a may be received and interpreted by stacking/control port 502a and the stacking/control port 502b, respectively, on the new stack unit 502.

The method 400 then proceeds to block 428 where a stack port probe reply a received from the new stack unit. In an embodiment, the stack unit replacement engine on the new stack unit 502 may receive the stack port probe packet sent at block 426 and, in response, mark the ports that received the stack port probe packet for conversion to the stack port mode, as well as send a stack port probe reply from the ports that received the stack port probe packet. For example, stack port probe packets may be received at each of the stacking/control ports 502a and 502b on the new stack unit 502 and, in response, the stack unit replacement engine may mark each of the stacking/control ports 502a and 502b for conversion to the stack port mode, while sending a stack port probe reply from the stacking/control port 502a to the stacking control/port 304b on the stack unit 304, and sending a stack port probe reply from the stacking/control port 502b to the stacking control/port 308a on the stack unit 308. The stack unit replacement engine (e.g., on the stack unit 304, on the stack unit 308, and/or provided by a plurality of stack units in the stack system 300, etc.) may then receive the stack port probe replies at each of the stacking control/port 304b on the stack unit 304 and the stacking control/port 308a on the stack unit 308. In response to marking each of the stacking/control ports 502a and 502b for conversion to the stack port mode, the stack unit replacement engine (e.g., on the new stack unit 502) may operate to convert each of the stacking/control ports 502a and 502b from the Ethernet port mode (e.g., XE mode) to the stack port mode (e.g., HiGig mode).

The method 400 then proceeds to block 430 where the ports at the opposite ends of the stack system are converted to stack port mode. In an embodiment, the stack unit replacement engine (e.g., on the stack unit 304, on the stack unit 308, and/or provided by a plurality of stack units in the stack system 300, etc.) may detect the receipt of stack port probe replies at each of the stacking control/port 304b on the stack unit 304 and the stacking control/port 308a on the stack unit 308 and, in response, convert each of the stacking control/port 304b and the stacking control/port 308a from the Ethernet port mode (e.g., XE mode) to the stack port mode (e.g., HiGig mode). The method 400 then proceeds to block 432 where a configuration is sent to the new stack unit. In an embodiment, the stack unit replacement engine (e.g., on the stack unit 304, on the stack unit 308, and/or provided by a plurality of stack units in the stack system 300, etc.) then sends an instruction to a master stack unit to retrieve a configuration (e.g., the configuration previously applied to the stack unit 306 that was replaced) and provide that configuration to the new stack unit 502. The stack unit replacement engine on the new stack unit 502 may then apply that configuration to the new stack unit 502 such that the new stack unit 502 joins the stack system 300 and provides a ring stack configuration for the stack system 300, as illustrated in FIG. 5c.

Thus, systems and methods have been described that provide for automatic stack unit replacement in a stack system simply by connecting a new stack unit to the stack system. Embodiments of the systems and methods are enabled by automatically detecting when a ring stack configuration has been broken such that a daisy chain stack configuration is provided that includes inactive ports at opposite ends ("end ports") of a daisy chain stack configuration (which is indicative of the connection to the stack system of a new stack unit via ports in a Ethernet port mode). In response to this detection, those end ports are automatically converted to the Ethernet port mode to allow communication with the new stack unit, and that communication results in the new stack unit automatically converting its stack-system-connected ports from the Ethernet port mode to the stack port mode. The end ports are then automatically converted from the Ethernet port mode back to the stack port mode such that each of ports connecting the stack system to the new stack unit are in the stack port mode. This allows a configuration that was previously applied to the stack unit that was replaced to be automatically provided to the new stack unit, and thus the simple connection of the new stack unit to the stack system results in the new stack unit being automatically added to the stack system such that the stack system may function as it did with the previously stack unit that was replaced.

In the event multiple stack units in a stack system must be replaced, the method 400 described above may be performed for each new stack unit added to the stack system. Thus, a first new stack unit may be added to the stack system and the method 400 is performed until the configuration has been provided to the new stack unit at block 432, and then a second new stack unit may be added to the stack system according to the method 400 in the same manner, and so on. In addition, rather than being applied to a ring stack configuration as discussed above, the method 400 may be performed to add a new stack unit to a stack system that is originally operating in a daisy chain stack configuration and is to be converted to a ring stack configuration. One of skill in the art in possession of the teachings of the present disclosure will recognize that the operations according to the method 400 have no impact on the operation of the stack system because the ports on the stack system that are converted between the stack port mode and Ethernet port mode are inactive and not a part of the stacking topology until the new stack unit is configured at the conclusion of the method 400.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A stack unit, comprising:
   a first stack unit chassis;
   a first port included on the first stack unit chassis; and
   a stack unit replacement engine that is coupled to the first port and that is configured to:
   send a first stack port probe packet through the first port operating in a stack port mode;
   determine that a ring stack configuration of a stack system has been broken such that a daisy chain stack configuration of the stack system is provided by:
   determining, in response to not receiving a first stack port probe reply to the first stack port probe packet, that the first port is inactive when operating in a stack port mode and is located on a first end of the daisy chain stack configuration of the stack system; and
   determining that a second port that is included on a second stack unit chassis is inactive when operating in the stack port mode and is located on a second end of the daisy chain stack configuration of the stack system;
   in response to determining that the ring stack configuration of the stack system has been broken such that the daisy chain stack configuration of the stack system is provided, convert the first port from the stack port mode to an Ethernet port mode;
   receive a communication from a new stack unit at the first port following the converting of the first port from the stack port mode to the Ethernet port mode and, in response, confirm that the first port is connected to the new stack unit;
   send a second stack port probe packet from the first port operating in the Ethernet port mode to the new stack unit, wherein the second stack port probe packet is configured to cause the new stack unit to convert a third port included on the new stack unit that is connected to the first port to the stack port mode;
   receive a second stack port probe reply through the first port from the new stack unit and, in response, convert the first port from the Ethernet port mode to the stack port mode; and
   in response to receiving the second stack port probe reply, cause a master stack unit in the stack system to provide a configuration to the new stack unit.

2. The stack unit of claim 1, wherein the stack unit replacement engine is further configured to:
   mark the first port as inactive when operating in the stack port mode in response to failing to receive the second stack port probe reply at the first port following the coupling the first port to the third port that is included on the new stack unit and that is operating in the Ethernet port mode, wherein the first port is determined to be inactive in response to being marked as inactive.

3. The stack unit of claim 1, wherein the communication is received from the new stack unit at the first port through a connection to the third port on the new stack unit that is a stacking port.

4. The stack unit of claim 3, wherein the second stack port probe packet is sent from the first port to the third port, and the second stack port probe reply is received from the third port by the first port.

5. The stack unit of claim 1, wherein the stack unit replacement engine is further configured to:
   determine that a configuration packet has not been received at the first port within a predetermined time period following the converting of the first port from the stack port mode to the Ethernet port mode and, in response, convert the first port from the Ethernet port mode to the stack port mode.

6. The stack unit of claim 1, wherein the communication from the new stack unit is a Dynamic Host Configuration Protocol (DHCP) packet.

7. The stack unit of claim 1, wherein the stack unit replacement engine is further configured to:
   in response to determining that the ring stack configuration of the stack system has been broken such that the daisy chain stack configuration of the stack system is provided, cause the second port to be converted from the stack port mode to the Ethernet port mode;
   wherein a third stack port probe packet is configured to cause the new stack unit to convert a fourth port that is connected to the second port to the stack port mode; and
   wherein in response to receiving a third stack port probe reply through the fourth port from the new stack unit, the second port is converted from the Ethernet port mode to the stack port mode.

8. An information handling system (IHS) stack, comprising:
a plurality of stack IHSs coupled together to provide an IHS stack system, wherein each of the plurality of stack IHSs includes at least one port; and
a stack IHS replacement engine that is coupled to the plurality of stack IHSs and that is configured to:
send a first stack port probe packet through a first port on a first stack IHS of the plurality of stack IHSs operating in a stack port mode;
determine that a ring stack configuration of the IHS stack system has been broken such that a daisy chain stack configuration of the IHS stack system is provided by:
determining, in response to not receiving a first stack port probe reply to the first stack port probe packet, that the first port is inactive when operating in the stack port mode and is located on a first end of the daisy chain stack configuration of the IHS stack system; and
determining that a second port on a second stack IHS of the plurality of stack IHSs is inactive when operating in the stack port mode and is located on a second end of the daisy chain stack configuration of the IHS stack system;
in response to determining that the ring stack configuration of the IHS stack system has been broken such that the daisy chain stack configuration of the IHS stack system is provided, convert each of the first port and the second port from the stack port mode to an Ethernet port mode;
receiving a communication from a new stack IHS at each of the first port and the second port following the converting of each of the first port and the second port from the stack port mode to the Ethernet port mode and, in response, confirm that the first port and the second port are connected to the new stack IHS;
send a second stack port probe packet from the first port operating in the Ethernet port mode and send a third stack port probe packet from the second port operating in the Ethernet port mode to the new stack IHS, wherein the second stack port probe packet from the first port is configured to cause the new stack IHS to convert a third port included in the new stack IHS that is connected to the first port to the stack port mode, and the third stack port probe packet from the second port is configured to cause the new stack IHS to convert a fourth port included in the new stack IHS that is connected to the second port to the stack port mode;
receive a second stack port probe reply through the first port from the third port and a third stack port probe reply through the second port from the fourth port and, in response, convert each of the first port and the second port from the Ethernet port mode to the stack port mode; and
in response to receiving the second stack port probe reply and the third stack port reply, cause a master stack unit in the stack system to provide a configuration to the new stack IHS.

9. The IHS stack of claim 8, wherein the stack IHS replacement engine is further configured to:
mark each of the first port and the second port as inactive when operating in the stack port mode in response to failing to receive a stack port probe packet reply at the first port and the second port following the coupling the first port to a third port that is included on the new stack IHS and that is operating in the Ethernet port mode and the coupling the second port to a fourth port that is included on the new stack IHS and that is operating in the Ethernet port mode, wherein each of the first port and the second port are determined to be inactive in response to being marked as inactive.

10. The IHS stack of claim 8, wherein the communication is received from the new stack IHS at the first port through a connection to the third port on the new stack IHS that is a stacking port and the communication is received from the new stack IHS at the second port through a connection to a fourth port on the new stack IHS that is a stacking port.

11. The IHS stack of claim 10, wherein the second stack port probe packet is sent from the first port to the third port and the third stack port probe packet is sent from the second port to the fourth port, and the second stack port probe reply is received from the third port by the first port and the third stack port probe replay is received from the fourth port by the second port.

12. The IHS stack of claim 8, wherein the stack IHS replacement engine is further configured to:
determine that a configuration packet has not been received at each of the first port and the second port within a predetermined time period following the converting of each of the first port and the second port from the stack port mode to the Ethernet port mode and, in response, convert each of the first port and the second port from the Ethernet port mode to the stack port mode.

13. The IHS stack of claim 8, wherein the communication from the new stack IHS is a Dynamic Host Configuration Protocol (DHCP) packet.

14. A method for replacing a stack unit in a stack system, comprising:
sending a first stack port probe packet through a first port operating in a stack port mode;
determining that a ring stack configuration of a stack system has been broken such that a daisy chain stack configuration of the stack system is provided by:
determining, in response to not receiving a first stack port probe reply to the first stack port probe packet, that the first port is inactive when operating in a stack port mode and is located on a first end of the daisy chain stack configuration of the stack system; and
determining that a second port is inactive when operating in the stack port mode and is located on a second end of the daisy chain stack configuration of the stack system;
in response to determining that the ring stack configuration of the stack system has been broken such that the daisy chain stack configuration of the stack system is provided, converting the first port from the stack port mode to an Ethernet port mode;
receiving a communication from a new stack unit at the first port following the converting of the first port from the stack port mode to the Ethernet port mode and, in response, confirm that the first port is connected to the new stack unit;
sending a second stack port probe packet from the first port operating in the Ethernet port mode to the new stack unit, wherein the second stack port probe packet is configured to cause the new stack unit to convert a third port that is included in the new stack unit and that is connected to the first port to the stack port mode;

receiving a second stack port probe reply through the first port from the new stack unit and, in response, convert the first port from the Ethernet port mode to the stack port mode; and in response to receiving the second stack port probe reply, cause a master stack unit in the stack system to provide a configuration to the new stack unit.

15. The method of claim 14, further comprising:

marking the first port as inactive when operating in the stack port mode in response to failing to receive the second stack port probe reply at the first port following the coupling the first port to the third port that is included on the new stack unit and that is operating in the Ethernet port mode, wherein the first port is determined to be inactive in response to being marked as inactive.

16. The method of claim 14, wherein the communication is received from the new stack unit at the first port through a connection to the third port on the new stack unit that is a stacking port.

17. The method of claim 14, further comprising:

determining that a configuration packet has not been received at the first port within a predetermined time period following the converting of the first port from the stack port mode to the Ethernet port mode and, in response, converting the first port from the Ethernet port mode to the stack port mode.

18. The method of claim 14, wherein the communication from the new stack unit is a Dynamic Host Configuration Protocol (DHCP) packet.

19. The method of claim 14, further comprising:

in response to determining that the ring stack configuration of the stack system has been broken such that the daisy chain stack configuration of the stack system is provided, causing the second port to be converted from the stack port mode to the Ethernet port mode;

wherein a third stack port probe packet is configured to cause the new stack unit to convert a fourth port that is connected to the second port to the stack port mode; and wherein in response to receiving a third stack port probe reply through the fourth port from the new stack unit, the second port is converted from the Ethernet port mode to the stack port mode.

* * * * *